(12) United States Patent
Schafer

(10) Patent No.: US 6,236,131 B1
(45) Date of Patent: May 22, 2001

(54) UNILATERAL TRANSVERSE FLUX MACHINE WITH A MULTI-STRAND DESIGN

(75) Inventor: Uwe Schafer, Berlin (DE)

(73) Assignee: DaimlerChrysler Rail Systems GmbH, Berlin (DE)

( * ) Notice: Subject to any disclaimer, the term of this patent is extended or adjusted under 35 U.S.C. 154(b) by 0 days.

(21) Appl. No.: 09/402,373
(22) PCT Filed: Mar. 25, 1998
(86) PCT No.: PCT/EP98/01724
  § 371 Date: Mar. 29, 2000
  § 102(e) Date: Mar. 29, 2000
(87) PCT Pub. No.: WO98/45927
  PCT Pub. Date: Oct. 15, 1998

(30) Foreign Application Priority Data

Apr. 3, 1997 (DE) .............................. 197 14 895

(51) Int. Cl.$^7$ .......................... H02K 21/12; H02K 41/03; H02K 37/12
(52) U.S. Cl. ............................ 310/163; 310/216; 310/254
(58) Field of Search .................................. 310/163, 164, 310/162, 257, 254, 52, 54, 58, 60 R, 61, 216; 29/596–598

(56) References Cited

U.S. PATENT DOCUMENTS

| 5,051,641 | * | 9/1991 | Weh ..................................... 310/163 |
| 5,117,142 | * | 5/1992 | Zweygbergk ........................ 310/156 |
| 5,633,551 | * | 5/1997 | Weh ..................................... 310/266 |
| 5,889,348 | * | 3/1999 | Muhlberger et al. ................ 310/218 |
| 5,982,070 | * | 11/1999 | Caamano ............................ 310/216 |

FOREIGN PATENT DOCUMENTS

| 36 02 268 | 7/1987 | (DE) . |
| 36 02 687 | 8/1987 | (DE) . |
| 43 00 440 | 1/1994 | (DE) . |
| 196 14 862 | 4/1996 | (DE) . |
| 44 43 999 | 4/1996 | (DE) . |
| 195 32 614 | 10/1996 | (DE) . |
| 195 22 382 | 12/1996 | (DE) . |
| 195 24 543 | 1/1997 | (DE) . |
| 0 243 425 | 11/1987 | (EP) . |
| 2 730 873 | 8/1996 | (FR) . |

OTHER PUBLICATIONS

M. Bork and G. Henneberger, "New Transverse Flux Concept For An Electric Vehicle Drive System", ICEM, Jan. 1996.

\* cited by examiner

*Primary Examiner*—Nestor Ramirez
*Assistant Examiner*—Tran Nguyen
(74) *Attorney, Agent, or Firm*—Venable; Norman N. Kunitz

(57) ABSTRACT

An improved, multi-strand design of a transverse flux machine with unilateral stator and rotor, with essentially U-shaped yokes (6) and I-shaped yokes (3) in the stator, as well as a rotor with permanent magnets (5) that are attached planar and a circular back iron (4). The bending of the U-shaped yokes (6) at a right angle results in a considerable reduction of the leakage paths. A joint use of the stator yoke by several strands results in a considerable increase in the torque density, as compared to known embodiments. The direct cooling of winding and stator iron makes it possible to have a machine design with considerably reduced eddy current losses.

8 Claims, 4 Drawing Sheets

UNILATERAL TRANSVERSE FLUX MACHINE WITH A MULTI-STRAND DESIGN

CROSS REFERENCE TO RELATED APPLICATION

This application is a 371 of PCT/EP98/01724, filed Mar. 25, 1998.

BACKGROUND OF THE INVENTION

The invention relates to a multi-strand transverse flux machine with a unilateral stator and rotor, and having: essentially U-shaped yokes, that are assigned to the strands, and essentially I-shaped yokes arranged respectively alternately one behind the other in one plane in the stator with electrical annular windings; a rotor that is provided with permanent magnets that are attached planar to it surface adjacent to the yokes, with the rotor having a circular back iron; permanent magnets that are arranged in rows, mechanically displaced against each other; and currents that flow through the annular windings are electrically displaced accordingly. Such a transverse flux machine is known from the contribution of M. Bork and G. Henneberger "New Transverse Flux Concept for an Electric Vehicle Drive System," ICEM 1996.

Machines of this type can be constructed with an extremely high torque density. The machines are used in road vehicles or rail vehicles, preferably as direct drives that are built into the wheel hub. The range of use here extends from the passenger vehicle with single-wheel drive to locomotives and large utility vehicles. Other options for use are with stationary direct drives having a high constant output range, such as reeling drives and textile machines.

Transverse flux machines are for the most part embodied as two-strand machines because they have a dual stator arrangement, which does not allow for the realization of more than two strands with respect to production technology.

Known embodiments of two-sided transverse flux motors, e.g. as disclosed in the German Patent 44 43 999 A1 or the German Patent 195 22 382 A1, offer a high torque density, but can only be produced at high expense. These are contrasted by unilateral and also multi-phase transverse flux machines, which can be manufactured easily, but which have a considerably lower torque density because of the high rotor leakage (German Patent 195 32 614 A1).

The German Patent 36 02 268 A1 discloses a transverse flux machine, for which a right-angle bend of the legs for the U-shaped yoke is indicated. However, nothing is said about this measure in the text.

A different geometric design for a transverse flux machine is furthermore known from the European Patent 0 243 425, for which two side-by-side arranged U-shaped stator yokes are connected. Each half of the center leg in this case carries its flux. A possible savings potential is not indicated.

Known is furthermore the previously disclosed design by Bork and Henneberger of a transverse flux motor with unilateral stator and tangential back iron in the rotor. This solution also permits an embodiment with more than two strands because the individual strands can be lined up next to each other with a specific gap in between.

FIG. 1 accordingly shows a pole pair for a multi-pole arrangement. The p pole pairs can be lined up in a linear arrangement as linear motor and, in the case of an annular bending of the coil, can be embodied as rotatory machine. In the following, reference is made to a rotatory embodiment.

The active part of the machine stator consists of an annular winding 1 and a number p of essentially U-shaped, soft-magnetic yokes 2, which partially enclose the winding 1, as well as I-shaped soft-magnetic yokes 3 that are arranged in between the yokes 2. The U-shaped yokes 2 and the I-shaped yokes 3 can have a different width $b_u$ and $b_I$ for carrying the flux with varied intensity. The active part of the rotor for each strand consists of two annular rotor yokes 4 of a soft-magnetic material, to which are respectively attached 2p permanent magnets 5 with alternating radial magnetization. The torque-to-bore volume ratio of this embodiment is limited owing to the leakage path saturation.

SUMMARY OF THE INVENTION

It is the object of the invention to provide a unilateral transverse flux machine of the aforementioned type, for which the leakage paths are reduced, so that the torque-to-bore volume ratio is increased, the overall length is reduced and the poles require less soft-magnetic material.

This object generally is achieved according to the present invention by a multi-strand transverse flux machine with unilateral stator and rotor, wherein: essentially U-shaped yokes, that are assigned to the strands, and essentially I-shaped yokes are respectively alternatively arranged one behind the other in one plane in the stator with electrical annular windings; a rotor is provided with permanent magnets that are attached planar to its surface adjacent to the yokes, with the rotor having a circular back iron; the permanent magnets are arranged in rows, mechanically displaced against each other; the currents flowing through the annular windings are electrically displaced accordingly; the legs of the U-shaped yokes of each individual strand are bent toward each other in each plane; the adjacent legs of the strands, which are respectively arranged in one plane, are connected to each other, at least some portions of the connected legs of several strands are used jointly for conducting the flux; and the thickness of the connected, jointly used legs is reduced in accordance with predetermined flux conditions.

The leakage paths are advantageously reduced as a result of the bending of the legs for the U-shaped yokes toward each other. As a result of this, it is also possible to arrange the U-shaped yokes and the I-shaped yokes without a gap next to each other, meaning without risking a short-circuit at the bending location, which reduces the overall length of the machine. Finally, pole material is saved as a result of the multiple use of the center legs of the U-shaped yokes.

Advantageous embodiments of the invention are disclosed and discussed.

The invention is to be explained below with the aid of an preferred embodiment.

DETAILED DESCRIPTION OF THE PREFERRED EMBODIMENTS

One advantageous embodiment of the multi-strand transverse flux machine is obtained by combining several single-strand embodiments the axial direction. However, these do not require a space between the strands according to the invention and in contrast to arrangements known so far. The preferred number of strands is three, but higher or lower strand numbers are possible as well.

Figure 1:
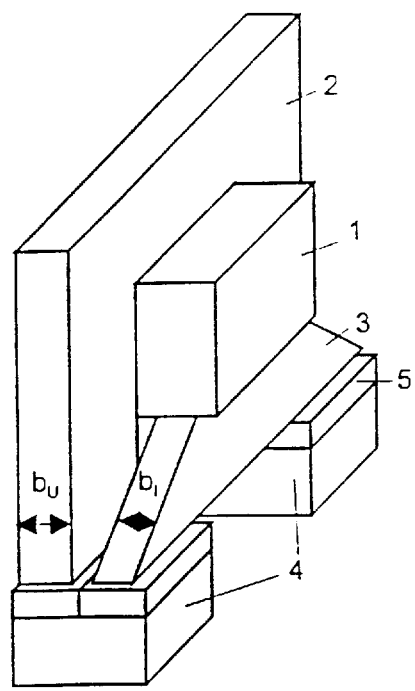
FIG. 1 is a schematic view of a pole pair for a multi-pole arrangement of a unilateral transverse flux machine of the type to which the present invention is directed.
Figure 2:
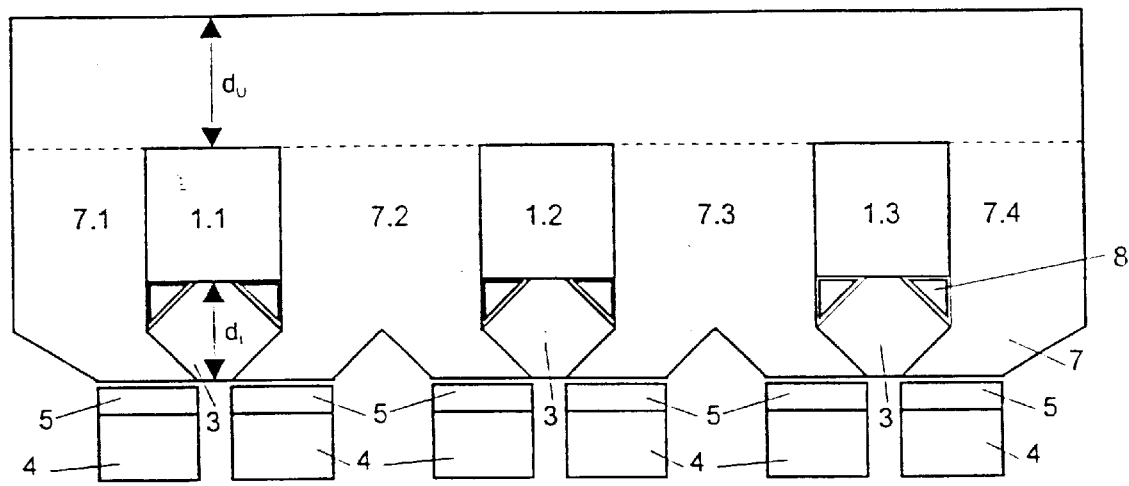
FIG. 2 is a schematic radial section of an exemplary embodiment of a three-strand design of a transverse flux machine according to the invention.
Figure 3:
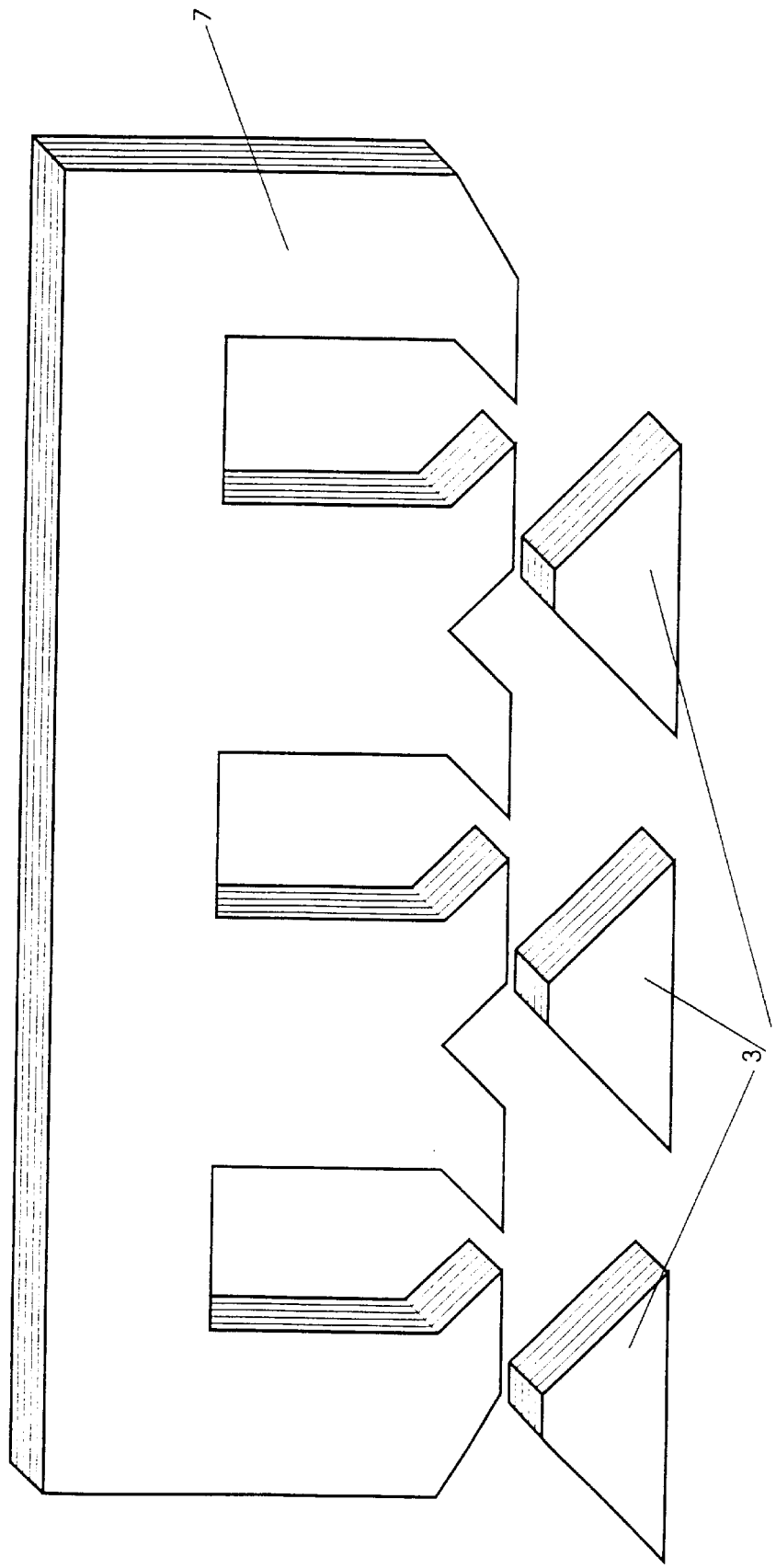
FIG. 3 shows a set of I-shaped yokes and a U-shaped yoke for a three strand machine that are axially laminated.
Figure 4:
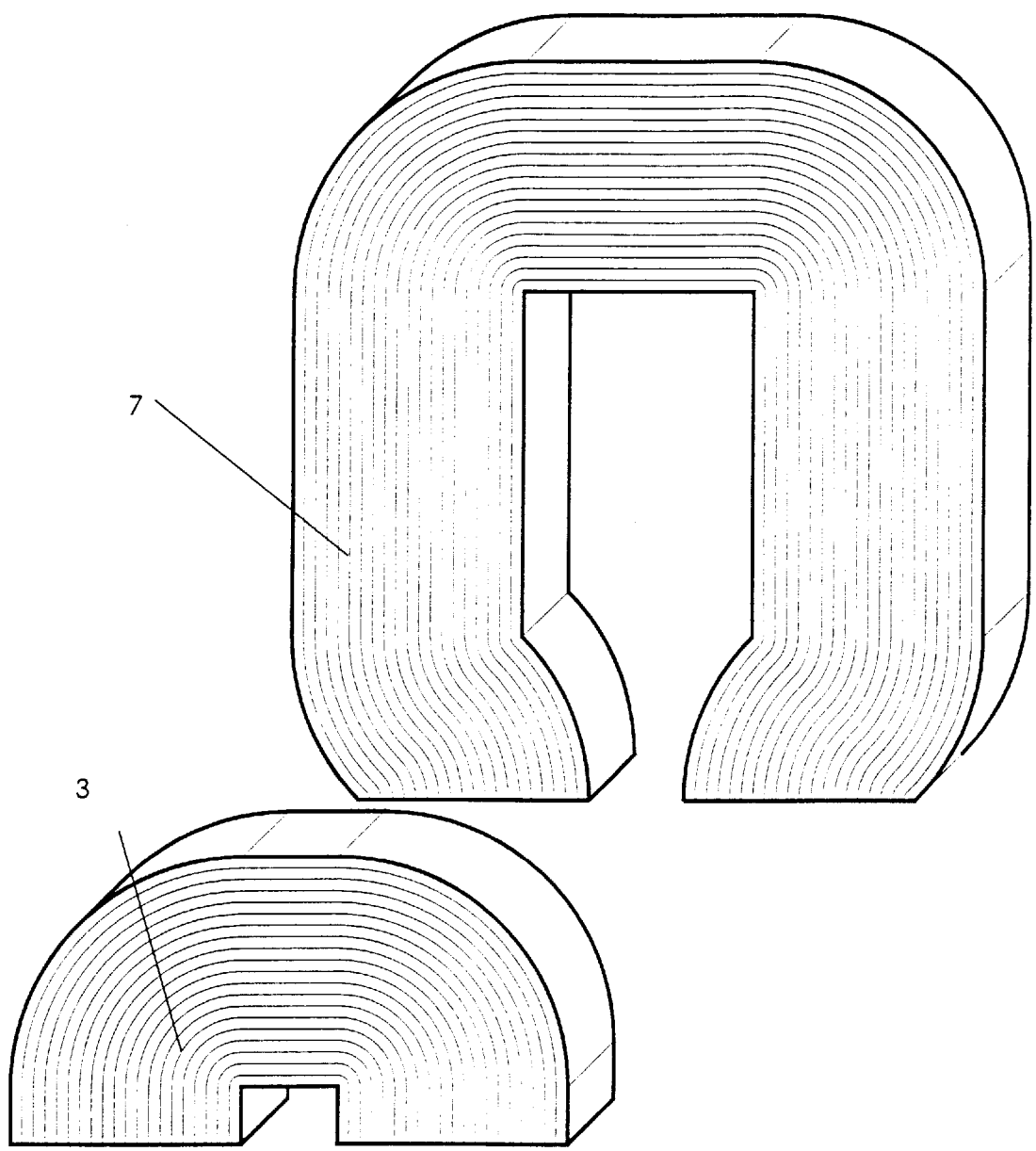
FIG. 4 shows a set of an I yoke and an U yoke for a one strand machine that are manufactured of cut strip wound cores.
Figure 5:
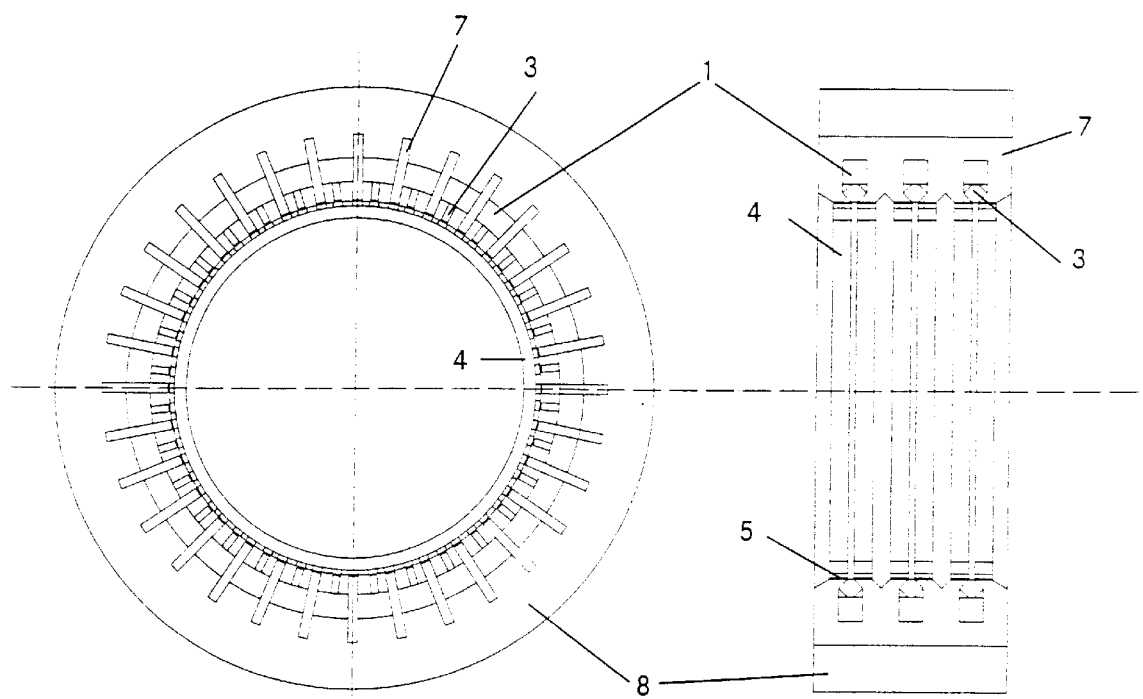
FIG. 5 shows an arrangement of a machine according to the invention with three strands, an inside rotor with the active elements e.g., magnets, and an outside stator with the yokes, as well as an insulation support structure 8 that fixes the position of the U- and I-shaped yokes.
Figure 6:
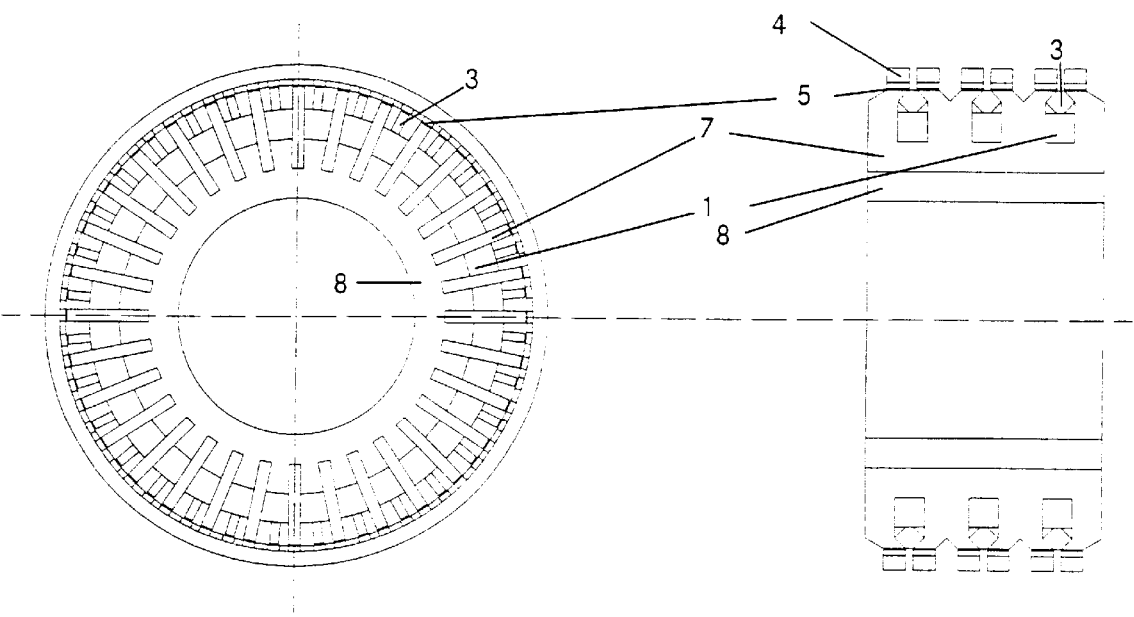
FIG. 6 shows an arrangement of a machine according to the invention with three strands, an outside rotor with the active elements, e.g., magnets yokes, as well as an insulation support structure 8 that fixes the position of the U and I yokes.

FIG. 2 shows an exemplary embodiment of a three-strand embodiment in a radial section. The stator of the motor has three annular windings 1.1, 1.2 and 1.3 through which phase-displaced currents flow. The annular windings 1.1–1-3 are arranged to be tangential to the dynamic effect. A row of essentially U-shaped yokes 7 partially encloses the annular windings 1.1. to 1.3, which yokes are respectively bent at a right angle toward each other for each strand. Each yoke 7 has four legs 7.1 to 7.4 in one plane, of which the center legs are divided on the side facing the rotor. The legs have a common back iron.

The respectively adjacent legs 7.2 and 7.3 of the three strands are connected to each other and are used jointly by two strands for conducting the flux. The center legs 7.2 and 7.3 of the stator yokes each are designed to be narrower or thinner than the total thickness of the outer legs 7.1 and 7.4, corresponding to the total magnetic flux resulting from the superimposition of the strand fluxes.

Each stator yoke is assigned three essentially I-shaped yokes 3, which are located behind the yoke 7 as seen in the cross section. The pole height $d_u$ in the region where the U-shaped yokes 7.1 to 7.4 are not bent toward each other is higher in the region of windings 1.1 to 1.3 than the pole height $d_I$ of the I-shaped yokes 3. Permanent magnets 5 are arranged on the rotor in six rows, which are located opposite the legs for the stator yokes. The rows of magnets are geometrically displaced against each other, corresponding to the electric phase displacement of the strands, so that the legs 7.1 to 7.4 among themselves have different magnetization, depending on the rotor position. Each row of permanent magnets 5 has on the rotor side a soft-magnetic back iron 4 in a tangential direction.

FIG. 2 also shows an advantageous arrangement according to the invention for cooling the liquid in a transverse flux machine. As a result of the bending toward one another of the legs of the U-shaped yokes, the cooling liquid 8 in this case is conducted in a circular, parallel to the winding 1.1 to 1.3. As a result, the annular winding and the thermally stressed regions of the stator yoke are cooled effectively. In this way, it is possible to produce at least parts of the support structure for the stator from an insulating material. Above all, this concerns the region of high leakage flow between the U-shaped yokes and the I-shaped yokes. As a result, eddy current losses developing in the metal supports of known embodiments can be reduced considerably.

What is claimed:

1. A multi-strand transverse flux machine with unilateral stator and rotor, wherein:

essentially U-shaped yokes that are assigned to the strands and essentially I-shaped yokes are respectively alternately arranged one behind the other in one plane in the stator with electrical annular windings;

a rotor is provided with permanent magnets that are attached planar to its surface adjacent to the yokes, said rotor having a circular back iron;

the permanent magnets are arranged in rows, mechanically displaced against each other;

currents flowing through the annular windings are electrically displaced accordingly;

legs (7.1 to 7.4) of the U-shaped yokes of each individual strand are bent toward each other in each plane;

adjacent legs (7.2, 7.3) of the strands, which are respectively arranged in one plane, are connected to each other at least some portions of the connected legs (7.2, 7.3) of several strands are used jointly for conducting the flux; and a thickness of the connected, jointly used legs (7.2, 7.3) is reduced in accordance with predetermined flux conditions.

2. A transverse flux machine according to claim 1, wherein a pole height ($d_u$) in a region where the legs of respective U-shaped yokes (7.1 to 7.4) are not bent toward one another is higher than a pole height ($d_I$) of the I-shaped yokes (3), at least in the region of the winding (1.1 to 1.3).

3. A transverse flux machine according to claim 1, wherein
   the U-shaped yokes (7.1 to 7.4) and the I-shaped yokes (3) are laminated in an axial direction.

4. A transverse flux machine according to claim 3, characterized in that
   wherein
   that yokes are designed such that they can be divided.

5. A transverse flux machine according to 1,
   wherein
   the U-shaped yokes (7.1 to 7.4) and I-shaped yokes (3) are designed as strip-wound cut cores.

6. An embodiment of the transverse flux machine according to claim 1, with an inside or outside rotor, or in the form of a linear motor.

7. A transverse flux machine according to claim l,
   wherein
   a means for conducting cooling agent, which is arranged in a winding window of the U-shaped yokes (7.1 to 7.4), runs essentially parallel to the annular winding (1.1 to 1.3) and is thermally closely connected to the yokes (7.1 to 7.4) and the annular winding (1.1 to 1.3).

8. A transverse flux machine according to claim 1,
   wherein
   an insulating support structure is provided, at least in a region of high leakage flow between the U-shaped yokes (7.1 to 7.4) and the I-shaped yokes (3).

* * * * *